United States Patent [19]
Ganesan

[11] Patent Number: 5,838,792
[45] Date of Patent: *Nov. 17, 1998

[54] COMPUTER SYSTEM FOR CENTRALIZED SESSION KEY DISTRIBUTION, PRIVACY ENHANCED MESSAGING AND INFORMATION DISTRIBUTION USING A SPLIT PRIVATE KEY PUBLIC CRYPTOSYSTEM

[75] Inventor: Ravi Ganesan, Arlington, Va.

[73] Assignee: Bell Atlantic Network Services, Inc., Arlington, Va.

[ * ] Notice: The term of this patent shall not extend beyond the expiration date of Pat. No. 5,557,678.

[21] Appl. No.: 694,373

[22] Filed: Aug. 8, 1996

Related U.S. Application Data

[63] Continuation-in-part of Ser. No. 277,376, Jul. 18, 1994, Pat. No. 5,557,678.

[51] Int. Cl.⁶ ...................................................... H04L 9/30
[52] U.S. Cl. ................................................ 380/21; 380/30
[58] Field of Search .......................................... 380/30, 21

[56] References Cited

U.S. PATENT DOCUMENTS

| | | |
|---|---|---|
| 4,200,770 | 4/1980 | Hellman et al. . |
| 4,218,582 | 8/1980 | Hellman et al. . |
| 4,405,829 | 9/1983 | Rivest et al. . |
| 4,424,414 | 1/1984 | Hellman et al. . |
| 4,736,423 | 4/1988 | Matyas . |
| 4,860,353 | 8/1989 | Brown . |
| 4,888,800 | 12/1989 | Marshall et al. . |
| 4,926,478 | 5/1990 | Gruenberg . |
| 4,965,827 | 10/1990 | McDonald . |
| 4,995,082 | 2/1991 | Schnorr . |
| 5,016,274 | 5/1991 | Micali et al. ............................. 380/23 |
| 5,029,208 | 7/1991 | Tanaka . |
| 5,052,040 | 9/1991 | Preston et al. . |
| 5,073,935 | 12/1991 | Pastor ........................................ 380/30 |
| 5,150,411 | 9/1992 | Maurer . |
| 5,208,853 | 5/1993 | Armbruster et al. . |
| 5,241,594 | 8/1993 | Kung . |
| 5,241,597 | 8/1993 | Bright . |
| 5,241,598 | 8/1993 | Raith . |
| 5,251,258 | 10/1993 | Tanaka . |
| 5,253,294 | 10/1993 | Maurer . |
| 5,276,737 | 1/1994 | Micali . |
| 5,297,206 | 3/1994 | Orton ........................................ 380/30 |
| 5,299,263 | 3/1994 | Beller et al. ............................. 380/30 |
| 5,375,169 | 12/1994 | Seheidt et al. . |

OTHER PUBLICATIONS

Digital Multisignature, C. Boyd, Proceedings of the Inst. of Math, and its Appl. on Cryptography and Coding, 15–17 Dec. 1986.

"A Method of Obtaining Digital Signatures and Public Key Cryptosystems", CACM, vol. 21, pp. 120–126, Feb. 1978, Rivest, Shamir and Adleman.

Bruce Schneier, "Applied Cryptography", Wiley & Sons, 1994, Sections 3.4 and 16.3 and p. 576. Multiple Key Public Key.

M.J. Wiener, "Cryptoanalysis of Short RSA Secret Exponents", IEEE Transaction on Information Theory, vol. 36, No. 3, pp. 553–558.

*Primary Examiner*—Gilberto Barron, Jr.
*Attorney, Agent, or Firm*—McDermott, Will & Emery

[57] ABSTRACT

An article of manufacture for effecting secure communications during a communications session between users in a secured communication cryptosystem in which users are each associated with a public crypto-key and a private crypto-key, includes computer readable storage medium having computer programming stored thereon. The stored computer programming is configured to be readable from the computer readable storage medium by a computer and thereby cause the computer to operate so as to generate a private crypto-key using a private exponent and a modulus N, which is the product of a plurality of numbers within a set of large prime numbers. The generated private crypto-key is divided into a private user key portion having a first bit length and a central authority key portion having a second bit length. The first bit length is smaller than the second bit length, and is no larger than fifteen percent of the bit length of the modulus N but no less than 56 bits. The private user key portion is directed only to a single user of the cryptosystem and the central authority's portion is directed to a central storage device.

22 Claims, 9 Drawing Sheets

COMPUTER SYSTEM FOR CENTRALIZED SESSION KEY DISTRIBUTION, PRIVACY ENHANCED MESSAGING AND INFORMATION DISTRIBUTION USING A SPLIT PRIVATE KEY PUBLIC CRYPTOSYSTEM

RELATED APPLICATION

This application is a continuation-in-part of application Ser. No. 08/277,376 filed Jul. 18, 1994, now U.S. Pat. No. 5,557,678.

BACKGROUND OF INVENTION

1. Field of the Invention

This invention relates to split private key cryptosystems. More particularly, the present invention relates to an pro- grammed computer and computer programming for session key distribution, privacy enhanced messaging and informa- tion distribution using a split private key cryptosystem.

2. Description of the Related Art

Cryptosystems have been developed for maintaining the privacy of information transmitted across a communications channel. Typically, a symmetric cryptosystem is used for this purpose. Symmetric cryptosystems, which utilize electronic keys, can be likened to a physical security system where a box has a single locking mechanism with a single key hole. One key holder uses his/her key to open the box, place a message in the box and relock the box. Only a second holder of the identical copy of the key can unlock the box and retrieve the message. The term symmetric reflects the fact that both users must have identical keys.

In more technical terms, a symmetric cryptosystem con- sist of an encryption function E, a decryption function D, and a shared secret-key, K. The key is a unique string of data bits to which the functions are applied. Two examples of encipherment/deencipherment functions are the National Bureau of Standards Data Encryption Standard (DES) and the more recent Fast Encipherment Algorithm (FEAL). To transmit a message, M, in privacy, the sender computes M=E (C,K), where C is referred to as the ciphertext. Upon receipt of C, the recipient computes M=D(C,K), to recover the message M. An eavesdropper who copies C, but does not know K, will find it practically impossible to recover M. Typically, all details of the enciphering and deciphering functions, E and D, are well known, and the security of the system depends solely on maintaining the secrecy of key, K. Conventional symmetric cryptosystems are fairly efficient and can be used for encryption at fairly high data rates, especially if appropriate hardware implementations are used.

Asymmetric cryptosystems, often referred to as public key cryptosystems, provide another means of encrypting information. Such systems differ from symmetric systems in that, in terms of physical analogue, the box has one lock with two non-identical keys associated with it. Either key can be used to unlock the box to retrieve a message which has been locked in the box by the other key.

In public key electronic cryptosystems, each entity, has a private key, d, which is known only to the entity, and a public key, e, which is publicly known. Once a message is encrypted with a user's public-key, it can only be decrypted using that user's private-key, and conversely, if a message is encrypted with a user's private-key, it can only be decrypted using that user's public-key. It will be understood by those familiar with the art that although the terms "encrypt" and "decrypt" and derivations thereof are used herein in describ- ing the use of public and private keys in an asymmetric public key cryptosystem, the term "transform" is commonly used in the art interchangeably with the term "encrypt" and the term "invert" is commonly used in the art interchange- ably with the term "decrypt". Accordingly, as used herein in describing the use of public and private keys, the term "transform" could be substituted for the term "encrypt" and the term "invert" could be substituted for the term "decrypt".

If sender x wishes to send a message to receiver y, then x, "looks-up" y's public key e, and computes $M=E(C,e_y)$ and sends it to y. User y can recover M using its private-key $d_y$, by computing $M=D(C,d_y)$. An adversary who makes a copy of C, but does not have $d_y$, cannot recover M. However, public-key cryptosystems are inefficient for large messages.

Public-key cryptosystems are quite useful for digital signatures. The signer, x, computes $S=E(M,d_x)$ and sends [M,S] to y. User y "looks-up" x's public-key $e_x$, and then checks to see if $M=D(S, e_x)$. If it does, then y can be confident that x signed the message, since computing S, such that $M=D(S, e_x)$, requires knowledge of $d_x$, x's private key, which only x knows.

Public-key cryptography also provides a convenient way of performing session key exchange, after which the key that was exchanged can be used for encrypting messages during the course of a particular communications session and then destroyed, though this can vary depending on the applica- tion.

One public key cryptographic system is the Rivest, Shamir, Adleman (RSA) system, as described in Rivest, Shamir and Adleman, "A Method of Obtaining Digital Signatures and Public Key Cryptosystems", CACM, Vol 21, pp 120–126, February 1978. RSA is a public-key based cryptosystem that is believed to be very difficult to break. In the RSA system the pair $(e_i, N_i)$, is user i's public-key and $d_i$ is the user's private key. Here $N_i=pq$, where p and q are large primes. Here also $e_i d_i=1 \bmod \phi(N_i)$, where $\phi(N_i)=(p-1)(q-1)$ which is the Euler Toitient function which returns the number of positive numbers less than $N_i$, that are relatively prime to $N_i$. A Carmichael function is sometimes used in lieu of a Euler Toitient function.

To encrypt a message being sent to user j, user i will compute $C=M^{(e_j)} \bmod N_j$ and send C to user j. User j can then perform $M=C^{(d_j)} \bmod N_j$ to recover M. User i could also send the message using his signature. The RSA based signature of user i on the message, M, is $M^{d_i} \bmod N_i$. The recipient of the message, user j, can perform $M^{(d_i)} \bmod N_i^{(e_i)} \bmod N_i$, to verify the signature of i on M.

In a typical mode of operation, i sends j, $M^{(d_i)} \bmod N_i$ along with M and a certificate $C=(i,e_i N_i) (d_{CA}) \bmod N_{CA}$, where C is generated by a Certificate Authority (CA) which serves as a trusted off-line intermediary. User j can recover i's public key from C, by performing $C^{(e_{CA})} \bmod N_{CA}$, as $e_{CA}$ and $N_{CA}$ are universally known. It should also be noted that in an RSA system the encryption and signatures can be combined.

Modifications to RSA systems have been proposed to enable multi-signatures to be implemented. Such an approach is described in Digital Multisignature, C. Boyd, Proceedings of the Inst. of Math, and its Appl. on Cryptog- raphy and Coding, 15–17 Dec. 1986. The proposed approach extends the RSA system by dividing or splitting the user private key d into two portions, say $d_i$ and $d_j$, where $d_i*d_j=d$.

Recently an improved system and method for split key public encryption has been disclosed using a split private key, see U.S. patent application Ser. No. 08/277,808 filed on Jul. 20, 1994 for Y. Yacobi and R. Ganesan entitled "A System and Method for Identity Verification, Forming Joint Signatures and Session Key Agreement in an RSA Public Cryptosystem". The described system and method, allow two system users to verify each other's identity, form a joint signature and establish and distribute a session key in an RSA environment.

The system and method developed by Yacobi and Ganesan provides significant benefits where no intermediary between the users needs to be empowered with the ability to ease drop on encrypted communications. However, in practical systems, it is often desirable or required, for reasons other than security, that an intermediary with such power be placed between the users. Such an intermediary can provide a central point of audit and service cancellation, as well as other benefits. For example, public subscription systems, such as public electronic mail systems, will normally have a central intermediary empowered to monitor the access of a subscriber and terminate access should a subscriber fail to pay his monthly access fee. However, those conventional systems lack the capability to easily and promptly authorize a user's access to the system and distribute a session key or implement lawful wiretaps, privacy enhanced messaging and secure message distribution.

Therefore, it is an object of the invention to provide a programmed computer and computer programming which facilitates confirmation of a user's authorized access to another user of the system by a central intermediary each time a communication is initiated using split private key public encryption.

It is a still further object of the present invention to provide a programmed computer and computer programming which facilitates distribution of session keys through a central intermediary using split private key public encryption.

It is also an object of the invention to provide a programmed computer and computer programming for session key distribution by a central intermediary using split private key encryption which facilitates the authorization and implementation of lawful wiretaps, privacy enhanced messaging and secure message distribution.

Additional objects, advantages and novel features of the present invention will become apparent to those skilled in the art from the following detailed description, as well as by practice of the invention. While the invention is described below with reference to preferred embodiments, it should be understood that the invention is not limited thereto. Those of ordinary skill in the art having access to the teachings herein will recognize additional applications, modifications and embodiments in other fields which are within the scope of the invention as disclosed and claimed herein and with respect to which the invention could be of significant utility.

SUMMARY OF THE INVENTION

The present invention provides an improved method and system using a split key public cryptosystem.

In accordance with one aspect of the invention, a first and second user private encryption key and a corresponding first and second user public encryption key for a respective first and second user of a split key public cryptosystem are generated. The private encryption keys are divided into first and second user key portions and corresponding first and second central authority key portions. The first and second user key portions are respectively disclosed to the first and second users. The central authority key portions and public encryption keys are disclosed to a central authority.

After receiving a request from either of the users to establish a communications session with the other user, the central authority generates a session key. The key is encrypted separately with (i) the first central authority key portion and corresponding public encryption key to form a first encrypted session key and (ii) with the second central authority key portion and corresponding public encryption key to form a second encrypted session key. The first and second encrypted session keys are respectively disclosed to the first and second users. The first user decrypts the session key by applying the first user key portion to the first encrypted session key. The second user decrypts the session key by applying the second user key portion to the second encrypted session key. Messages exchanged between the first and second users during a communications session are encrypted/decrypted by applying the session key to the message.

According to another aspect of the invention, which could be useful for legal wiretaps, one or more of the users, for example the Federal Bureau of Investigation (FBI) and/or the Department of Justice, generate a first message(s), such as a request for a session key provided to two other users. The message is encrypted with both the Justice Department's and the FBI's user key portions. The central authority decrypts the message by applying the central authority key portions and the first and second public encryption keys to the message corresponding to the Justice Department's and FBI's user key portions. Assuming proper decryption verifies that the wiretap is properly authorized, the central authority generates a reply message. The reply message may, for example, include a session encryption key which has been previously provided by the central authority to the other system users. The reply message is encrypted with the central authority key portions and the public encryption key portions corresponding to the Justice Department's and the FBI's user key portions. The Justice Department and FBI decrypt the reply message by applying their respective user key portions to the encrypted reply message. Thus the FBI and/or Justice Department now have the session key being used by the other users to encrypt and decrypt their communications.

The central authority can also generate another user private encryption key and corresponding public encryption key, for example, for the switch which establishes and controls communication links between other users. This private encryption key is likewise divided into a user key portion and a corresponding central authority key portion. The user key portion is provided to the switch. The central authority key portion and the user public encryption keys are retained by the central authority.

The central authority can now generate a message directing the switch to establish the wiretap, perhaps by copying and/or transmitting to the FBI the communications for which the wiretap has been authorized. This message is encrypted with the central authority key and public encryption key corresponding to the switch's user key portion. The switch decrypts the message by applying its user key portion to the encrypted message. If the message is properly decrypted, the switch knows the message came from the central authority and, in response to the message, copies and/or transmits the communications to the F.B.I. and/or Justice Department. The F.B.I. and/or Justice Department can decrypt the intercepted communications using the session key which was previously provided by the central authority.

According to still another aspect of the invention which can be applied to privacy enhanced messaging (PEM), a first user generates a message which is subjected to a hash function to form a hash message. The hash message is encrypted with the first user key portion. The central authority further encrypts the encrypted hash message by applying the first central authority key portion to the encrypted hash message to form a fully encrypted hash message. A second user applies the first user's public key portion to decrypt the fully encrypted hash message.

In accordance with a still other aspect of the invention relating to message distribution, which is particularly suitable for video distribution, although not limited thereto, a video, is encrypted with a message encryption key to form an encrypted video. The message encryption key is preferably a symmetric encryption key. Upon receipt of a user request to view the video, the central authority generates a session key as described previously. The message encryption key is encrypted with the session key to form an encrypted message encryption key. The central authority further encrypts the encrypted video with the requesting user's central authority key portion and public encryption key to form a fully encrypted video. The requesting user applies the session key to decrypt the encrypted message encryption key. The requesting user can then apply the decrypted message encryption key and the his/her user key portion to decrypt the fully encrypted video.

The system according to the present invention includes means, preferably a central security processor, for generating a first and second user private encryption key and a corresponding first and second user public encryption key for respective first and second users of the system. The security processor or other suitable means divide each of the user private encryption keys into a user key portion and a corresponding central authority key portion. Modems, interfaces and other communication devices may also be provided for respectively conveying the first and second user key portions to the first and second users.

The central authority key portions and user public encryption keys are preferably stored on central storage device such as a central security server. The central security processor and server are preferably located in a secured area and linked with system users by a communications network such as a small local area network, wide area network or public telephone network, or the INTERNET or any combination thereof.

A request of a first user to establish a communications session with second user is transmitted, by a suitable transmission device, to the central authority, who is represented on the system by the central security processor. The system could be implemented as part of an advanced intelligent network (AIN), in which case the request would be directed to the security processor by the AIN processor. Upon receiving the request, the central processor generates a session encryption key, which is typically a symmetric encryption key. The central processor then encrypts the session key separately with the first central authority key portion and corresponding user public encryption key to form a first encrypted session key and with the second central authority key portion and corresponding public encryption key to form a second encrypted session key. The private key portions and public keys are retrieved by the central processor from the central server prior to encrypting the session key.

The system has modems, interfaces and other means to respectively transmit the first and second encrypted session keys to the first and second users. These users are normally represented within the system by user stations. The first user's station receives the first encrypted session key and second user's station receives the second encrypted session key. Each user station preferably has a processor capable of decrypting the encrypted session key by applying the first or second user key portion, as applicable, to the received encrypted session key. The user station processors then apply the session key to encrypt and decrypt messages, which may be in the form of analog or digital voice, audio, video or data signals, transmitted, via the communications network, between the first and said second users.

In another embodiment, the system also includes one or more user stations or other means for encrypting a message with the first and second user key portions. The encrypted message is transmitted via the communications network to the central security processor. After receiving the encrypted message the central processor decrypts the message by retrieving from storage and applying the first and second central authority key portions and corresponding public encryption keys to the message. The processor then generates another message encrypted with the first and second central authority key portions and the corresponding public encryption key portions. This other encrypted message is transmitted via the communications network and received, for example, by a user station and decrypted by the station processor by applying the first and second user key portions to the encrypted message. If, for example the system is being used for a legal wiretap, the later encrypted message could be a session key for encrypting and decrypting messages exchanged during a communications session between users of the system other than the first and second users.

A typical system will also include at least one switch or other similar central device for establishing communications links between system users who desire to have a communications session. In one system embodiment, the central security processor has the capability to generate a user private encryption key and a corresponding user public encryption key for the switch and divides the user private encryption key into a user key portion and a corresponding central authority key portion. The user key portion may be stored on a switch processor, if desired. The central authority key portion and corresponding user public encryption key are preferably stored on the central security server.

Should, for example, a legal wiretap be authorized, the central security processor, in another embodiment, is capable of generating a message, and encrypting it with the central authority key and third user public encryption key corresponding to the switch's user key portion. The message could, for example, direct the switch to establish the tap. The encrypted message can be transmitted via the communications network, and received by the switch processor. The switch processor decrypts the encrypted message by application of the switch's user key portion. In accordance with the decrypted message the switch is reconfigured to copy or transmit encrypted messages between certain system users to the station or stations of the users who had obtained the wiretap authorization.

In another embodiment, the system incorporates means, preferably implemented within the user stations, for generating a hash message by applying a hash function to a message which will be communicated over the system. The user station encrypts the hash message with, for example, the user key portion of a first user. The encrypted hash message is transmitted, via the communications network, and received by the central security processor. The central security processor further encrypts the encrypted hash message with the central authority key portion for the first user to form a fully encrypted hash message. The fully encrypted hash message is transmitted via the network to another user station. After receipt, the recipient user station decrypts the message by applying the first user's public encryption key to the fully encrypted hash message.

In yet another embodiment which is particularly suitable for data or video distribution, the system also includes means, which could be the central security processor or preferably a separate processing unit, for encrypting a message, e.g. a compressed audio/video signal representing a video film, with a message encryption key to form an encrypted video. The message encryption key is preferably only known to the video owner or distributor. The encrypted video is stored in, for example, the central security server or another system server. After receipt of a request from a system user to view the video, and authorization from the video distributor, a session key is provided to the requester and the distributor as described above.

The distributor, using a user station, encrypts the message encryption key with the session key to form an encrypted message encryption key and transmits the encrypted key to the requester's station via the system's communications network. The requester's station decrypts the message encryption key using the session key. The central security processor retrieves the encrypted video from the central server and transmits the encrypted video to the requester's station. The requester's station receives the encrypted video and decrypts it by applying the decrypted message encryption key to the encrypted video.

In accordance with still other aspects of the invention the user key portions each have a bit length which is smaller than the bit length of the corresponding central authority key portion. It is preferred that the bit length of each user key portion which must be memorized or stored in a battery powered device, such as a cellular phone or personal communications device, is between 56 and 72 bits. The user private encryption key may be comprised of a private exponent and a modulus N which is a product of a plurality of numbers within a set of large secret prime numbers. In such cases the user public encryption key is comprised of a public exponent and the modulus N. It is also preferred that the bit length of each user key portion be no larger than fifteen percent of the bit length of the corresponding modulus N but no less than 56 bits.

Each user station and server, and the central authority processor/server will typically be represented by a computer which is driven by programming instructions stored on an associated computer readable storage medium to operate in the described manner. The computer could be a personal computer, work station, mini-computer, main frame computer or any other computing device with sufficient power to perform in accordance with the invention. The computer readable storage could be a hard or floppy disk, CD, ROM, RAM, DRAM, SRAM, EPROM or other memory device, including electrical, magnetic and optical memory. Storage media associated with each user station or server may be adapted to store a private key portion of the user crypto-key. Storage media associated with the central authority server will typically store the central authority private key portion and/or the public crypto-key of each user's crypto-key.

The present invention is described such that the public crypto-key is used for particular encryption or decryption functions and in combination with a particular portion of the corresponding private crypto-key. However, it will be understood by those skilled in the art that the public crypto-key could equivalently be used in the reciprocal functions (i.e. for decryption rather than encryption and vice versa) and with the other portion of the corresponding private crypto-key from those described.

PREFERRED EMBODIMENT OF THE INVENTION

The present invention provides a system and method for improving conventional cryptosystems using a joint signature protocol in which two (or more) parties must collaborate in order to compute the digital signature. No single party can compute such a signature independently.

Figure 1:
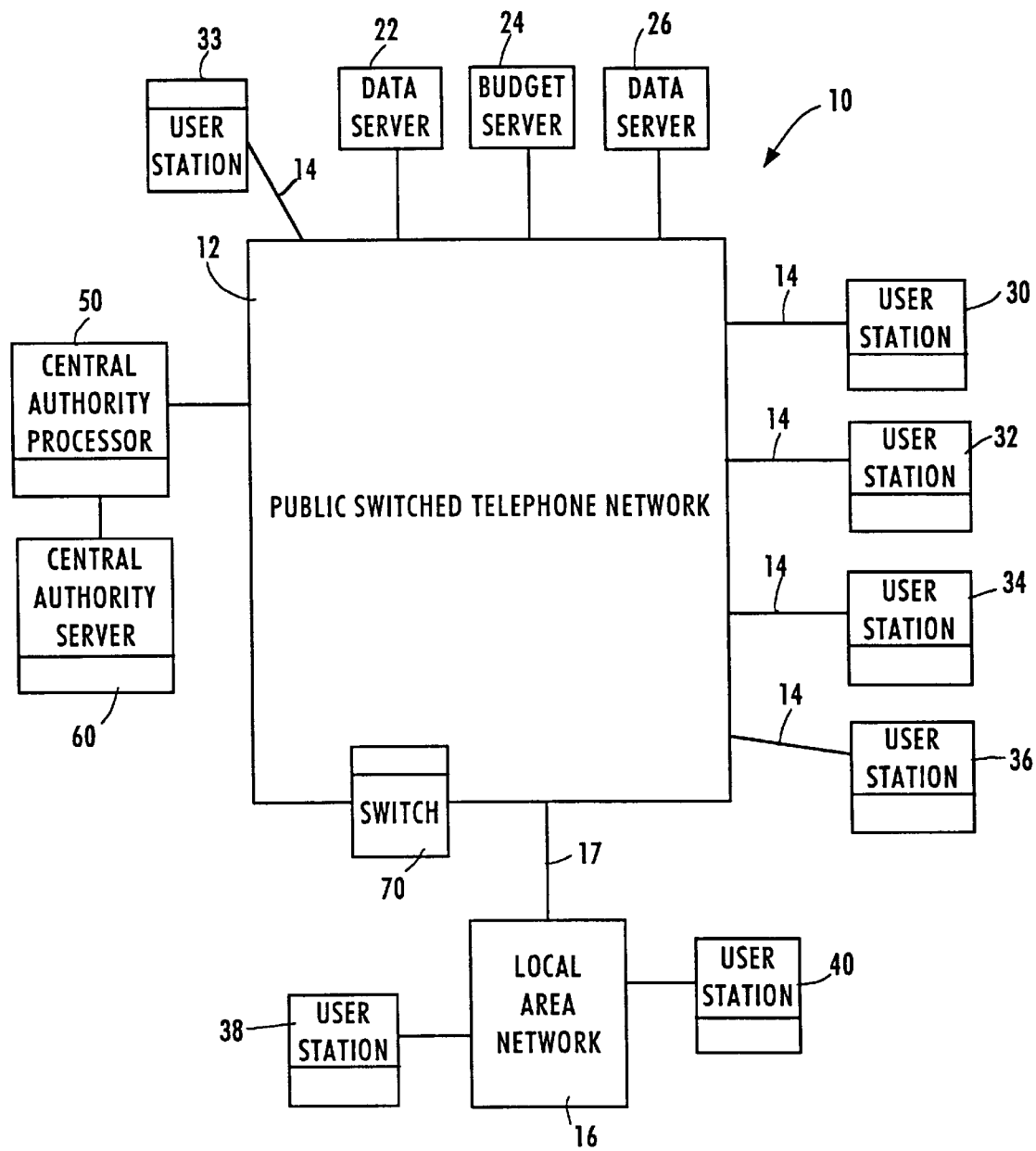
FIG. 1 illustrates a system in accordance with the present invention.

FIG. 1 schematically illustrates a distributed public cryptosystem 10 in accordance with the present invention. The distributed system 10 includes a communications network 12 which includes a switch 70 for establishing communication links between system users. A plurality of user stations, 30–40, are connected to a network 12. If, for instance, the network 12 is a public switched telephone network, the user stations 30–36 could be connected to network 12 via the subscriber lines 14. Another group of user stations, 38 and 40, are connected to the network 12 by the local area network (LAN) 16. The LAN 16 may, for example, be an Ethernet, token ring network or FDDI network. The LAN 16 is itself connected to the network 12, by a subscriber line 17. The user stations may be personal computers, work stations, telephones, personal communication devices, or any other device capable of inputting messages to and/or receiving messages from the network 12. The network 12 may be part of an advanced intelligent network (AIN). If the system is implemented in an AIN environment, communications beneficially are directed by one or more AIN processing units.

The distributed system 10 also includes a plurality of servers, 22–26. The servers illustratively contain databases which users at the user stations may wish to access. A central security processor 50 and central security server 60 complete the system.

Figure 2:
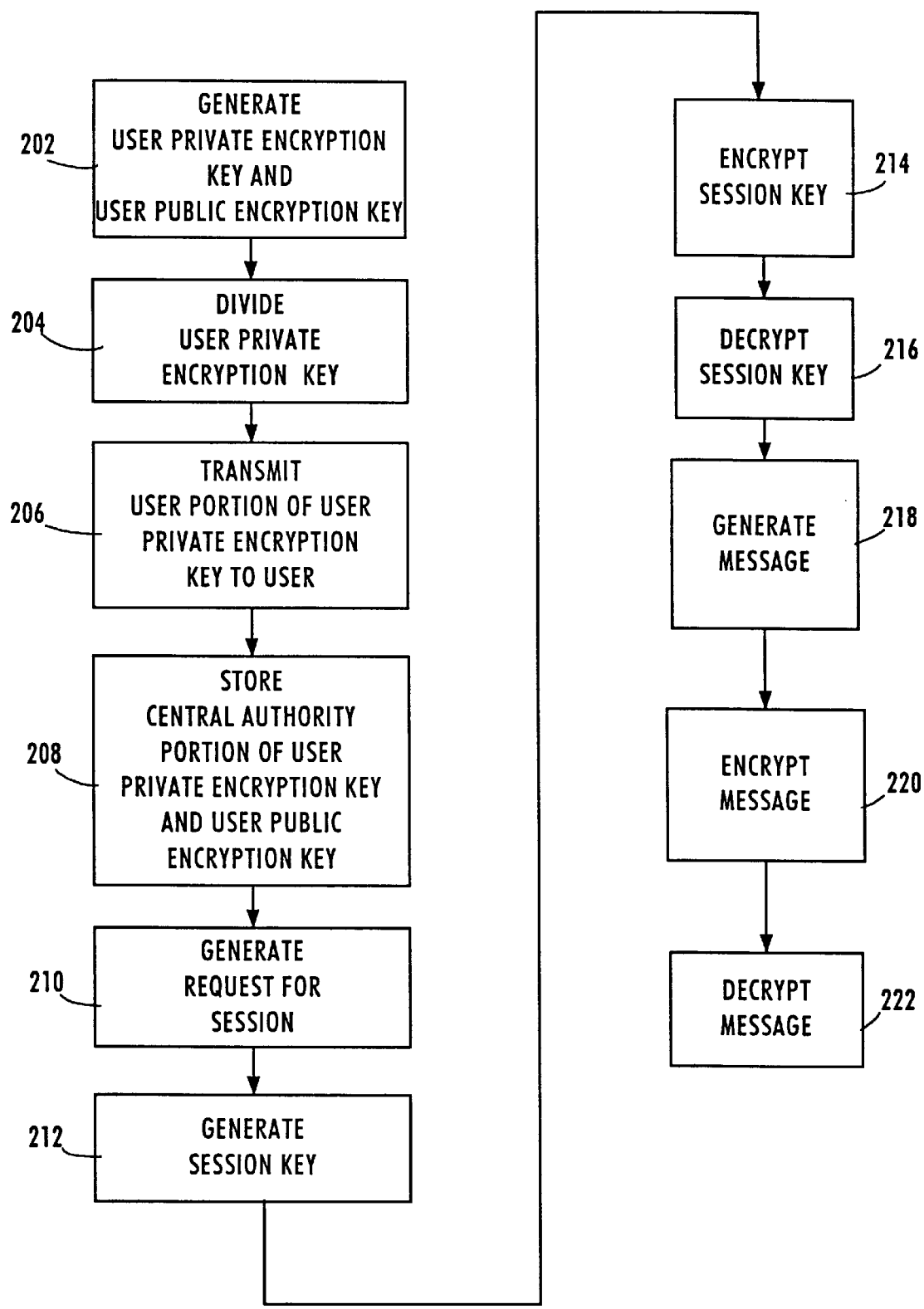
FIG. 2 illustrates session key distribution in accordance with the present invention.

Referring now to FIG. 2, in step 202 the private encryption keys and public encryption keys are generated by central security processor 50 for each user of the system. Processor 50 then divides the private encryption key into two portions in step 204. Alternatively, a user might select a private key portion for his/her own use. Processor 50 could then generate a second private key portion such that the user selected and processor generated private key portions can be joined to form the private encryption key.

Both the private and public encryption keys are typically generated using a private exponent and a modulus N which is the product of a large number of prime numbers. It is preferable that the length of the portion of the divided private encryption key which is maintained by the user be substantially smaller than the modulus N value. It is further preferred that the user portion of the divided private encryption key be no larger than 15% of the length of the modulus N but not less than 56 bits. If the modulus N is 512 bits in length and, the user portion of the private encryption key must be memorized by the user or stored in the user's personal communications device or cellular phone, the user's portion of the divided private encryption key is preferably be between 56 and 72 bits.

After the private encryption keys have been divided, the user's portion can be transmitted by processor 50 via the public switch network, subscriber lines, LAN, and other communications links to the users in step 206. Alternatively, if more security is desired, the user private key portions could be provided to each user in some other manner in step 206. The central authority's portion of the private encryption key and the public key for each user are stored on central security server 60 by processor 50 in step 208.

In step 210 a request is received from a user using user station 30 to establish a communication session with a user at user station 32. The request is transmitted via the network to processor 50. In response to the request, processor 50 generates a session key in step 212. If desired session keys can be pre-generated and stored on server 60; however it is generally preferable to generate session keys when required. In step 214, processor 50 encrypts the session key with the central authority's portion of the private encryption key and associated public encryption key for the users at stations 30 and 32 thereby forming two encrypted session keys. The session key encrypted with the central authority's portion of the private encryption key and associate public encryption key for the user at station 30 is transmitted to station 30. Correspondingly, the session key which has been encrypted by processor 50 with the central authority's portion of the station 32 user's private encryption key and associated public encryption is transmitted to station 32.

In step 216, the session key transmitted to station 30 is decrypted by the station 30 processor by applying that portion of the private encryption key which is maintained by the station 30 user. Similarly, station 32, using the portion of the private encryption key maintained by the station 32 user, decrypts the session key transmitted to station 32 by processor 50. Now that a session key has been distributed, communications between stations 30 and 32 can be secured. Thus, in step 218 a message is generated on station 30. The message is encrypted in step 220 by the station 30 processor with the session key. The encrypted message is transmitted via the network to station 32 and decrypted by the station 32 processor using the session key received by station 32.

Figure 3:
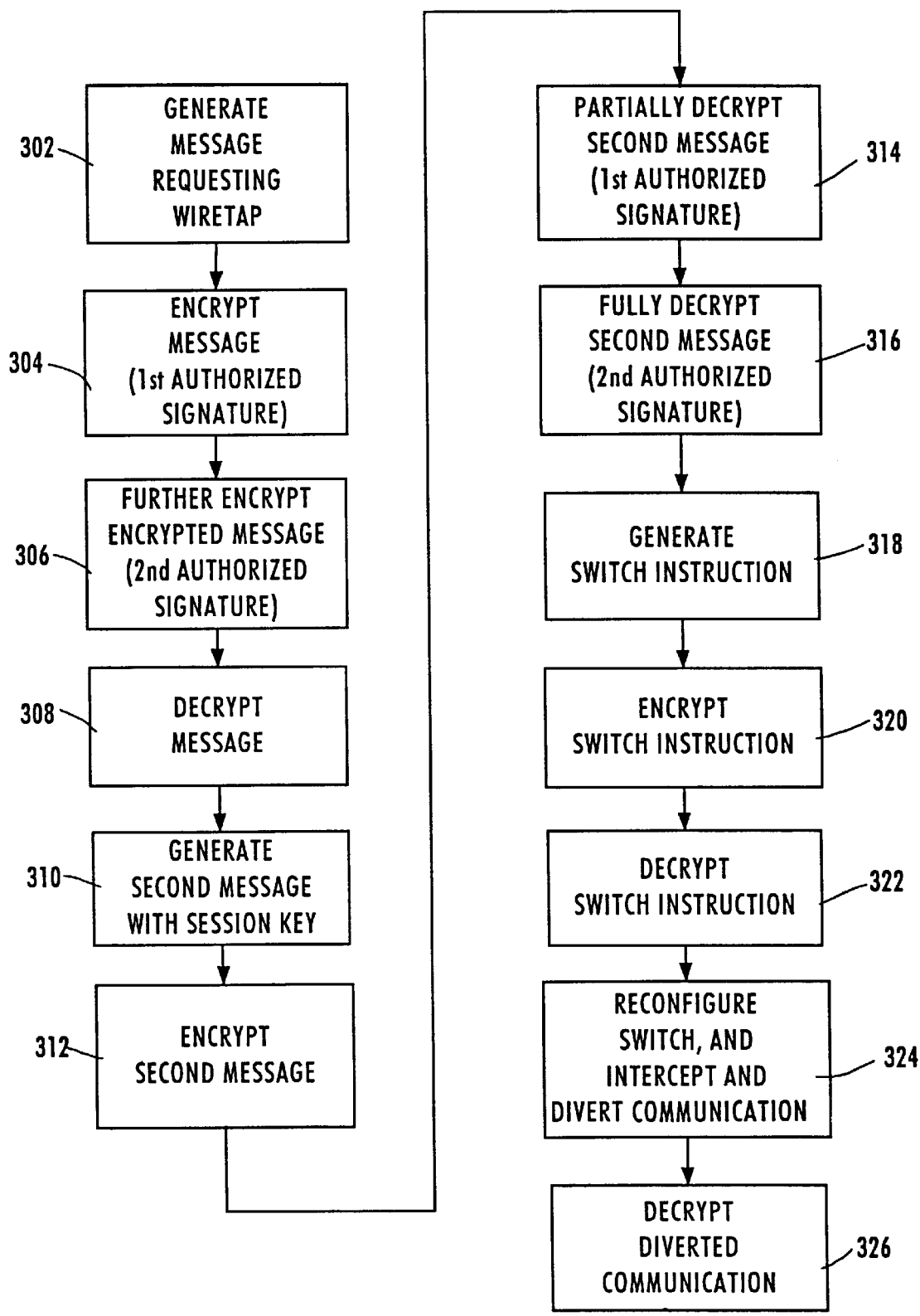
FIG. 3 illustrates wiretap authorization and implementation in accordance with the present invention.

FIG. 3 sets forth the preferred steps, should a wiretap be authorized, to intercept and eavesdrop on the communications between the users of stations 30 and 32. In step 302, a wiretap request is generated by a user on station 34. The message is encrypted in step 304 with the user's portion of his private encryption key on the station 34 processor and transmitted via the network to station 36 which is used by an individual required to authorize all wiretaps. If the user of station 36 is willing to authorize the wiretap, the message is further encrypted in step 306 by the station 36 user with his portion of his private encryption key. This jointly encrypted, or signed, message is transmitted by station 36 via the network to the central security processor 50. In step 308, the central security processor decrypts the message by applying the central authority's portion of state 34 and 36 user's private encryption keys and the associated public encryption keys to the message. The keys applied by processor 50 are retrieved as required from storage on central security server 60. Processor 50 knows that the wiretap has been properly authorized if the request for wiretap is properly decrypted by the application of the stored private encryption key portions and associated public encryption keys for the station 34 and 36 users, since these users must be known to processor 50 as having the joint authority to authorize wiretaps.

In step 310, station 50 generates a message containing the session key which has been provided to user stations 30 and 32. The session key is encrypted in step 312 with the central authority private encryption key portions and associated public encryption keys of the users of stations 34 and 36. The encrypted session key is then sent via the network to station 36 which applies its user's portion of the user's private encryption key to the message in step 314. This partially decrypted session key is transmitted via the network to station 34 which, in step 316, decrypts the message by applying its user's portion of the user's private encryption key.

In order to divert the communications between user stations 30 and 32 to station 34, processor 50 also generates a message to the switch 70 in step 318. The switch is treated as any other user of the system and thus a portion of the switch's private encryption key is maintained by the switch and the other portion of the switch's private encryption key and the associated public encryption key are stored on server 60. In step 320, processor 50 encrypts the message to the switch by applying the stored portion of the private encryption key and associated public encryption key for the switch. This encrypted message is transmitted via the network to the switch 70. Switch 70 decrypts the message by applying, in step 322, the portion of its private encryption key which it maintains and proceeds to configure the network in step 324 such that the communications between stations 30 and 32 are intercepted and diverted to station 34. Since the communications between station 30 and 32 have been encrypted with the session key which processor 50 has also provided to station 34, the intercepted communications can be decrypted by station 34 using the session key. Hence, in step 326 station 34 applies the session key to decrypt the intercepted messages. It should be noted that using the invention described herein, the authorized wiretap can be implemented without violating the secrecy of the user's portion of the private encryption key of those users whose communications are being intercepted.

Figure 4:
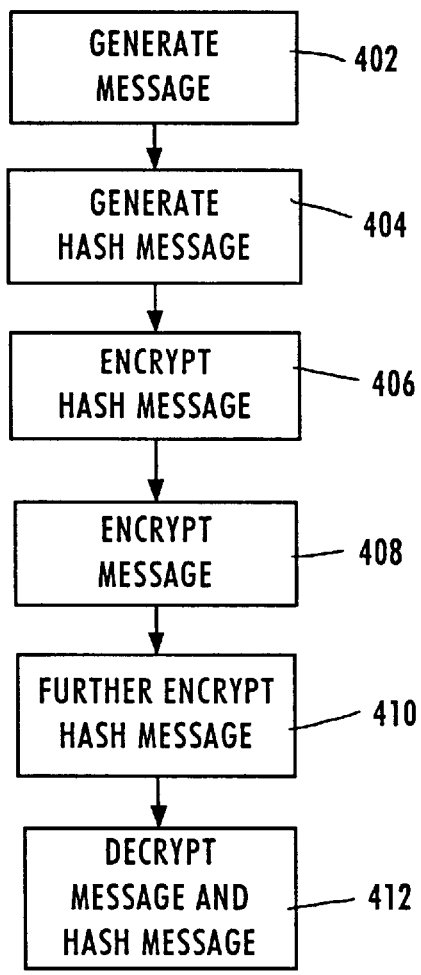
FIG. 4 illustrates privacy enhanced messaging (PEM) in accordance with the present invention.

FIG. 4 describes the steps implementing privacy enhanced messaging in accordance with the present invention. In step 402, a message is generated on station 30. Station 30 is, in accordance with this embodiment, provided with a hash function. In step 404 the station 30 processor applies the hash function to the generated message to generate a hash message. The hash message is encrypted in step 406 by station 30 using the user portion of the users private encryption key. In step 408 the message itself is encrypted by station 30 with the session key which had been distributed to stations 30 and 32 as described in connection with FIG. 2 above. The encrypted hash message and message are transmitted via the network to processor 50. In step 410, processor 50 further encrypts the hash message with the stored portion of the private encryption key for the user of station 30. This further encrypted hash message along with the encrypted message are transmitted by processor 50 via the network to station 32. To decrypt the messages, station 32 applies, in step 412, the public encryption key to the encrypted hash message and the session key to the encrypted message.

Figure 5:
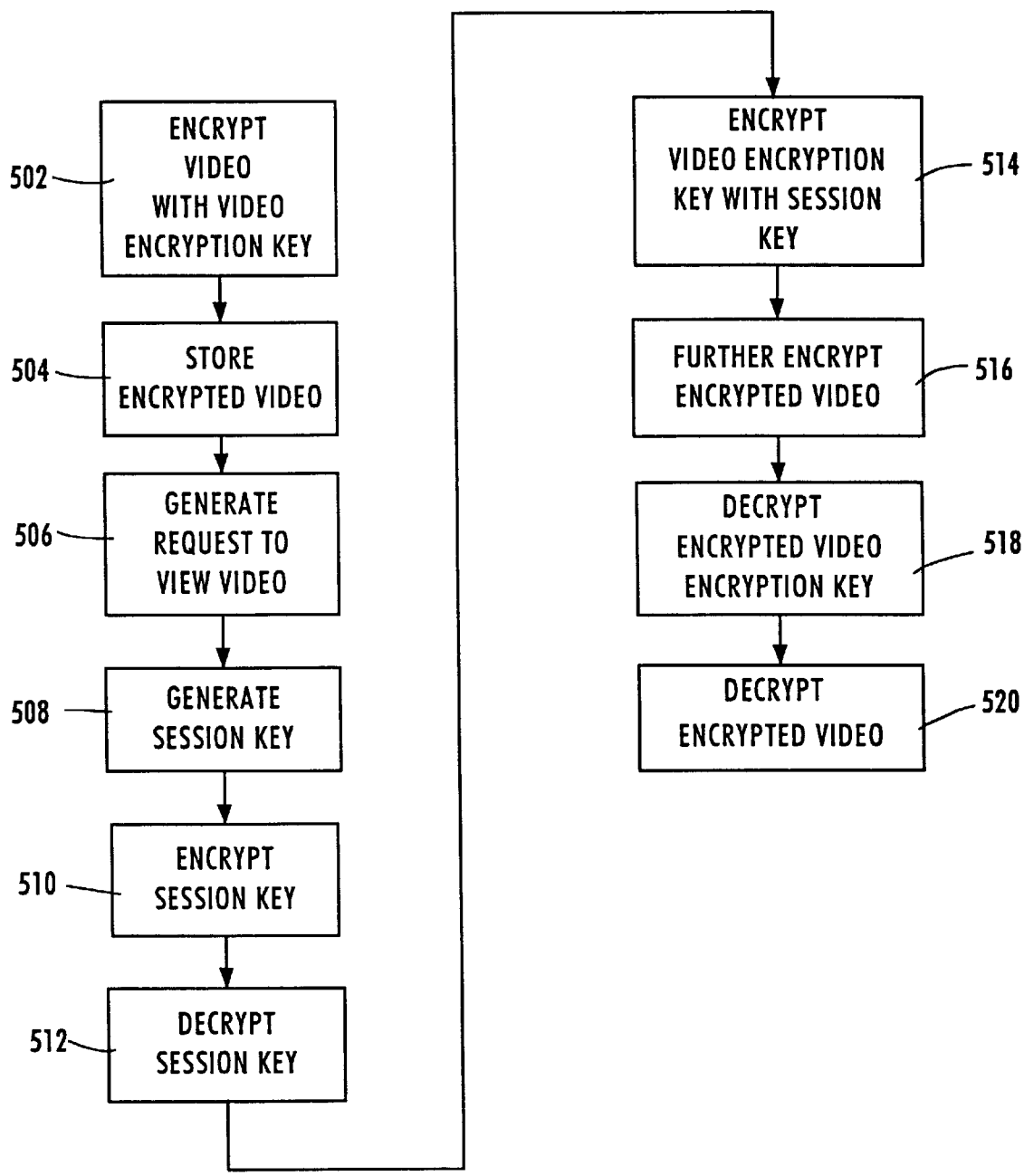
FIG. 5 illustrates video distribution in accordance with the present invention.

Turning now to FIG. 5, message distribution in accordance with the present invention will be described in the context of a video distribution system. In step 502 a video distributor acting through user station 33 encrypts a compressed video signal using a video encryption key which is preferably maintained with appropriate security in station 33's memory. The encrypted video is transmitted via the network to processor 50. This could be accomplished using a session key established between processor 50 and station 33 if desired. Processor 50 stores the encrypted video on server 60 in step 504. A user of station 38 generates a request to view the video in step 506 and transmits the request to processor 50 via network 12. Pursuant to the request, in step 508, station 50 generates a session key. The session key is encrypted in step 510 with the central authorities private encryption key portion and associated public encryption key for the users of stations 33 and 38 respectively. The appropriate encrypted session key is transmitted to station 33 and 38. In step 512, station 33 decrypts the session key by applying the video distributors retained portion of his private encryption key. Similarly, the session key is also decrypted by station 38 by applying the user portion of the private encryption key for the station 38 user to the encrypted session key received at that station. In step 514, station 33 encrypts the video encryption key with the session key and transmits the encrypted video encryption key to station 38 via the network. Processor 50 retrieves the encrypted video from storage on server 60 and in step 516 further encrypts the video with the central authorities private key portion and associated public encrypted key for the user of station 38. The encrypted video is next transmitted to station 38. In step 518, station 38 decrypts the video encryption key by applying the session key to the communication received from the video distributor station 33. Next in step 520, station 38 decrypts the video by applying the video encryption key and the user retained portion of the station 38 user's private encryption key to the encrypted video received from processor 50.

FIGS. 6–13 depict computers suitable for use as the user stations 30–40, the central authority processor/server 50–60 and the data or budget servers 22–26 and the switch 70 shown in FIG. 1. The computers are preferably commercially available personal computers or high-powered work stations. Each computer's processor could, for example, be a Pentium™ processor. Any commercially available keyboard and/or mouse and monitor can be utilized. A high-speed network interface, including a high-speed modem, is preferred although not mandatory. The depicted configuration of the computers is exemplary. One or more of the computers could, if desired, also or alternatively include other components (not shown), such as an optical storage medium. Any number configurations could be suitable for implementing the invention so long as sufficient storage capacity and processing capability are provided. All of the computers are depicted as having similar hardware configurations, although this is not necessarily the case. For example, as will be well understood by the skilled artisan, it may be desirable for components of the respective computers to have attributes such memory storage capacity, data transmission rates and processing speeds which differ. In this regard, typically the security, data and budget servers 22–26 and 60 would include a much larger hard drive and a faster processor than the user stations 30–40.

Each of the computers differ in their respective programming instructions so that each of the computers is uniquely driven to operated in accordance with the present invention. That is, the functionality of each of the computers described with reference to FIGS. 6–13 varies from that of the other computers due to the programming instructions which drive its operation. It will be understood that although FIGS. 6–13 depict computers which appear to be similar to each other, each of these computers will be driven to operate as described below by a different set of programming instructions even though the hardware components may be identical. It will also be recognized by those skilled in the art that only routine programming is required to implement the required programming instructions.

Figure 6:
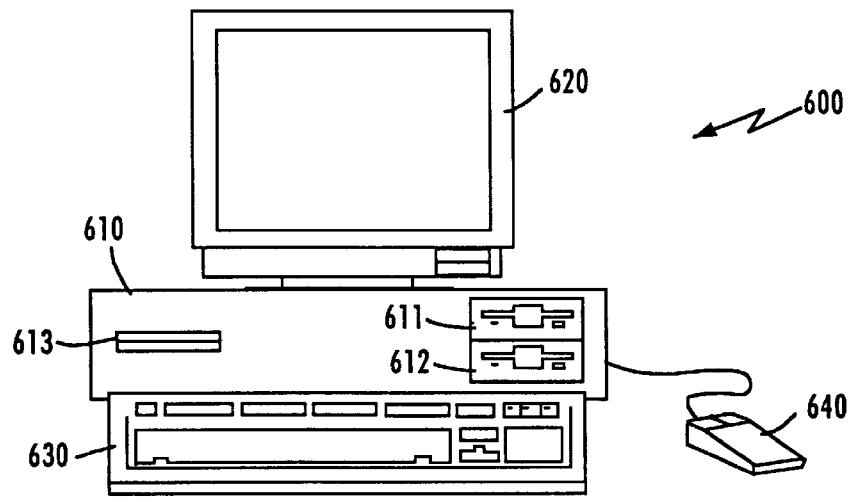
FIG. 6 depicts a computer suitable for use as a central authority processor/server depicted in FIG. 1.
Figure 7:
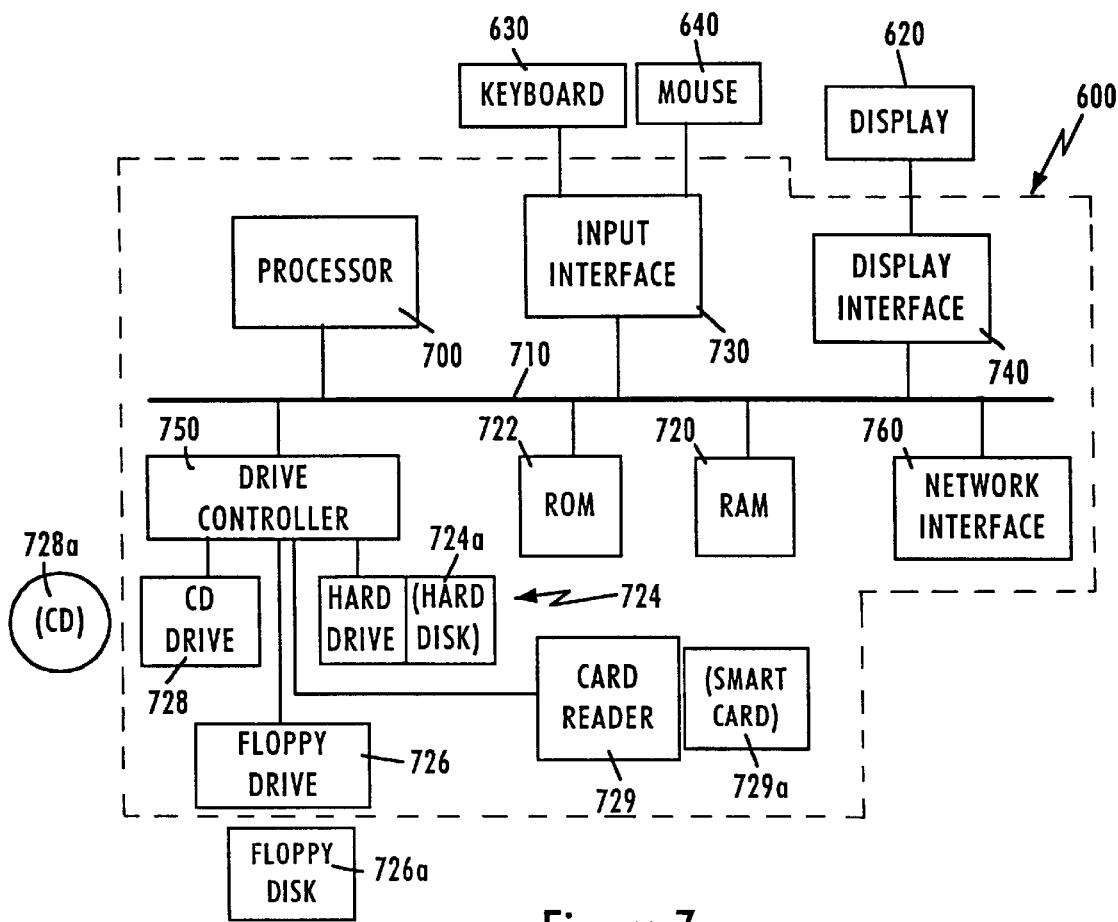
FIG. 7 is an exemplary block diagram of the computer depicted in FIG. 6.

To avoid unnecessary duplication the computers depicted in FIGS. 6–13 will be generally described only with reference to FIGS. 6 and 7. It should be understood that the corresponding components of the computers depicted in FIGS. 8–13 will be similar. Further, since the computer components and configurations are conventional, routine operations performed by the depicted components will generally not be described, such operations being well understood in the art.

Preferably, each of the computers initially stores its unique programming instructions on its ROM or hard disk. The private key portion of the user's crypto-key which the user retains may, if desired, be stored in each computer on the hard disk but is preferably maintained personally by the user in most cases. Session keys are preferably stored temporarily on the RAM. Additionally, the programming instructions and other information stored initially on the ROM or hard disk will typically be downloaded to the RAM during operation of the computer and accessed during operations directly from the RAM.

Referring now to FIGS. 6 and 7, the computer 600 includes a main unit 610 with slots 611, 612 and 613, respectively provided for loading programming or data from a floppy disc 726a, CD 728a and smart card 729a onto the computer 600. The computer 600 also includes a keyboard 630 and mouse 640 which serve as user input devices. A monitor display 620 is also provided to visually communicate information to the user.

As depicted in FIG. 7, The computer 600 has a main processor 700 which is interconnected via bus 710 with various storage devices including RAM 720, ROM 722 and hard disk 724a, all of which serve as a storage medium on which computer programming or data can be stored and accessed by the processor 700. The main processor 700 is also interconnected via bus 710 with various other devices such as the floppy disc drive 726, the CD drive 728 and the card reader 729 which are capable of being controlled by drive controller 750 to read computer programming or data stored on a floppy disc 726a, CD 728a or smart card 729a when inserted into the appropriate slot 611, 612 or 613 in the unit 610. By accessing the stored computer programming the processor 700 is driven to operate in accordance with the present invention.

The processor 700 is also operatively connected to the keyboard 630 and/or mouse 640, via input interface 730. The display monitor 620 is also interconnected to the processor 700, via display interface 740, to facilitate the display of information to the user. The network interface 760 is provided to interconnect the processor 700 to the network(s) 12 and/or 17 depicted in FIG. 1 and accordingly allow communications between the computer 600 and other network devices. Since the computer 600 serves as the central authority 50, 60, the network interface allows communications with user stations 30–40, network servers 22–26 and the switch 70.

The inter-operation of the various components of the computers depicted in FIGS. 6–13 in performing session key distribution, in accordance with the steps discussed above with reference to FIG. 2, will now be described. Referring first to FIGS. 6 and 7, a programmed computer 600 which serves as the central authority processor 50 and central authority server 60 depicted in FIG. 1. In response to a request for a crypto-key, the processor 700 is driven by programming instructions stored on the hard disk 724a to generate a private crypto-key and public crypto-key for a user as indicated in step 202 of FIG. 2.

The request may be entered on the keyboard 630 or using the mouse 640 of the central authority computer 600 and transmitted to the processor via input interface 730 and bus 710. Alternatively, the request may be received from a user station 30–40, server 22–26 or switch 70 via the network 12. Signals received by the network interface 760 are transferred to the processor 700 via the bus 710. As discussed earlier, the user request for a crypto-key may include a user private key portion which is separately selected by or generated for the user. In such a case, the processor 700 will generate the private crypto-key using the private key portion provided with the request.

The processor is next driven by stored programming instructions to divide the generated private crypto-key into two portions as indicated in step 204 of FIG. 2. The processor 700 directs the users portion of the private crypto-key to the network interface 760 via bus 710 for transmission over the network 12 to the applicable user station 30–40, server 22–26 or switch 70 as indicated in step 206 of FIG. 2. The processor 700 also, in accordance with its programmed instructions, directs the central authority's portion of the private crypto-key and the user's public crypto-key to the hard drive 724 which is controlled by the drive controller 750 to store the central authority's private key portion and the public crypto-key on hard disk 724a. As indicated in step 208 of FIG. 2.

Figure 8:
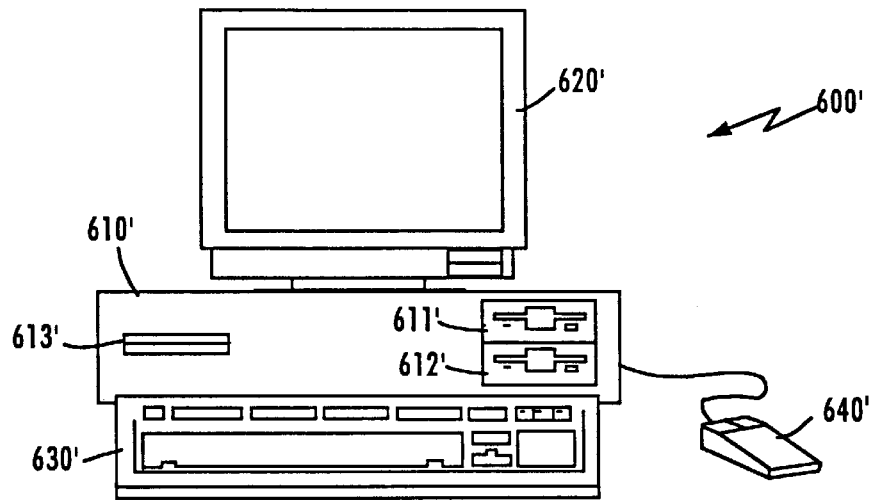
FIG. 8 depicts a computer suitable for use as the user stations or servers depicted in FIG. 1.
Figure 9:
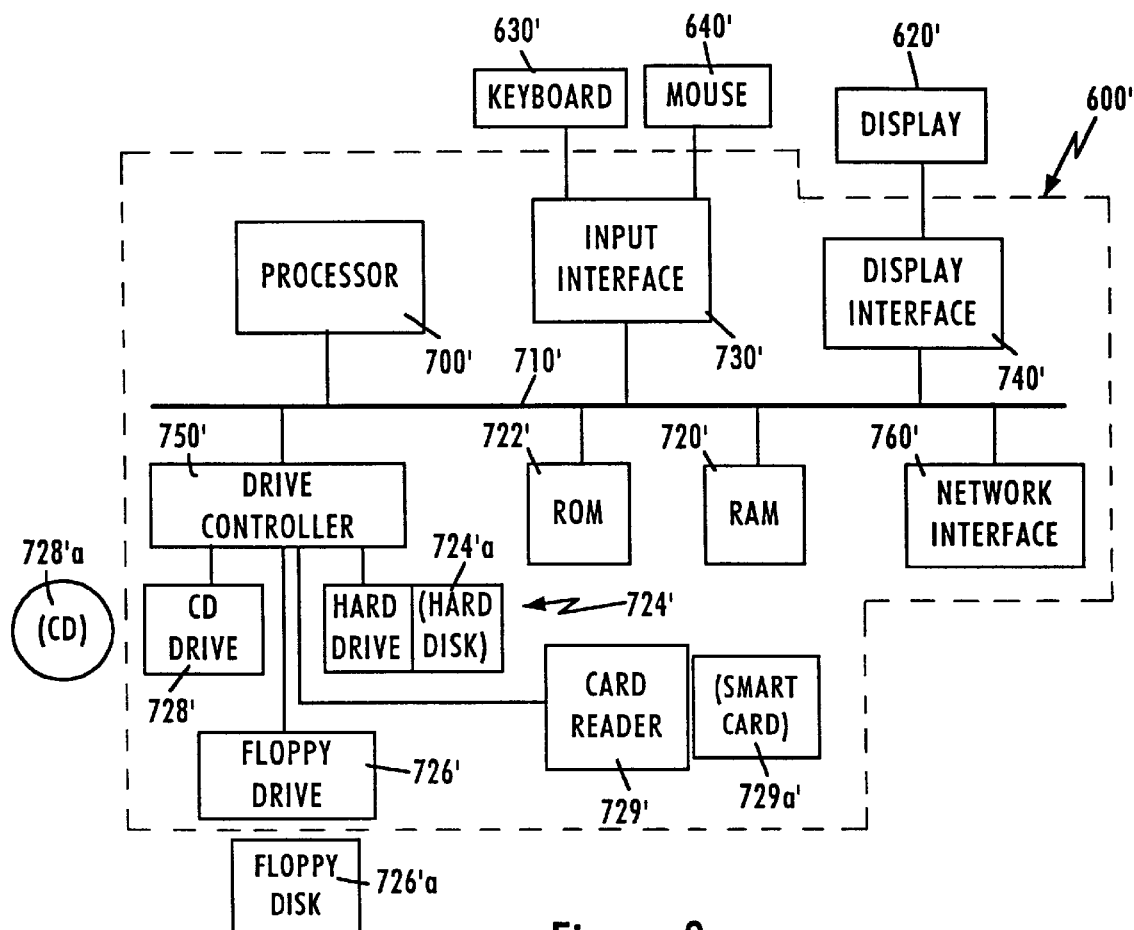
FIG. 9 is an exemplary block diagram of the computer depicted in FIG. 8.

Turning now to FIGS. 8 and 9. The computer 600' serves as any of the user stations 30–32 or 34–40 or server 22–26. A command is entered by a user on the keyboard 630' or using the mouse 640'. The command will typically be displayed on the monitor 620' and is received by the processor 700' via the input interface 730' and bus 710'. Responsive to the command and in accordance with its programming instruction stored on the hard disk 724a or ROM 722, the processor 700' generates a request for a session with another system user which is transferred via bus 710' to the network interface 760' for transmission over the network 12 as indicated in step 210 of FIG. 2.

Returning to FIGS. 6 and 7, the request is received by the network interface 760 and transferred to the processor 700 via the bus 710. The processor in accordance with its stored programming instructions generates a symmetric session key as indicated in step 212 of FIG. 2. As noted above, if desired, session keys could be generated in advance by the processor 700 responsive, for example, to commands entered on the keyboard 630 or using the mouse 640. In any event, the processor 700 retrieves from the hard disk 724a the central authority's portion of the private crypto-keys and the public crypto-keys of the applicable users who are to participate in the session. As discussed in the description of FIG. 2, the keys would be those associated with the users of stations 30 and 32 depicted in FIG. 1.

The processor 700, in accordance with its stored programming instructions, and as indicated in step 214, respectively encrypts the generated session crypto-key with the central authority's portion of the private crypto-key and associated public crypto-key of each of the applicable users to form encrypted session keys, i.e., each respectively encrypted with the central authority's private key portion and the public key portion associated with a respective one of the users. The processor 700 is now driven to direct each of the encrypted keys to the network interface 760 for transmission via the network 12 to a respective one of the users.

Referring again to FIGS. 8 and 9, each of the encrypted session keys is received by the appropriate user station or server or switch. Accordingly, a network interface 760' receives the encrypted session key which is transmitted via the bus 710' to the processor 700'. The processor 700' is driven by its stored programming instructions to decrypt the session key as described in step 216 of FIG. 2. More particularly, the portion of the user's private crypto-key which is maintained by the user is applied to the encrypted session key to decrypt the session key. Preferably, the user's private key portion is memorized by the user and hence would be entered via the keyboard 630' and transmitted via the input interface 730' and bus 710' to the processor 700'. The processor may store the user's private key portion temporarily on the RAM 720', if desired, although this is not preferred.

All the applicable users now have access to a common session key which has been securely distributed and can be used to secure communications between the applicable user. Accordingly, a message can now be entered, for example using keyboard 630' and reviewed on the monitored 620'. A command can be entered using the keyboard 630' or mouse 640' pursuant to which the processor 700' is driven by its stored programming instructions to encrypt the message, as indicated in step 220 of FIG. 2, with the session key which is preferable stored by the processor 700' on the RAM 720'. To perform this encryption, the processor 700' retrieves the session key from the RAM 720' via the bus 710' and applies the session key in the conventional manner to encrypt the message which has been received via input interface 730' and bus 710'. The encrypted message is now directed by the processor 700' through the bus 710' to the network interface 760' and transmitted via the network 12 to at least one other user. As described in step 220 of FIG. 2, the encrypted message is received by the network interface 760' of another user's station and directed to the processor 700' over the bus 710'. The processor 700' now retrieves the session key stored on its RAM 720' and applies the session key in the conventional manner to decrypt the message as discussed in step 222 of FIG. 2.

The operation of the computers depicted in FIGS. 6–9 in accordance with their respective stored programmed instructions will now be described in the context of establishing legal wiretaps in accordance with the steps described in FIG. 3. Referring first to FIGS. 8–9, to intercept or eavesdrop on communications between users who have been provided a session key to secure their communications, a wiretap request is generated by a processor 700' of a user station 30–32 or 34–40 which has not been given access to the session key, as described in step 302 of FIG. 2. The request will normally be entered via the keyboard 630', displayed on monitor 620' and sent via input interface 730' over the bus 710' to the processor 700'. The user's private key portion will also preferably be entered via the keyboard 630' and similarly forwarded to the processor 700'. The processor 700' in accordance with its stored programmed instructions encrypts the wiretap request with the user's private key portion which serves as a first authorized signature on the wiretap request as discussed in step 304. The encrypted request is sent over the bus 710' to the network interface 760' which transmits the encrypted request via the network 12 to another user station which is operated by another user who must also authorize the request.

The encrypted message is received by the other user station, also 600', via its network interface 760' and forwarded to the processor 700' via the bus 710'. The processor 700' will direct the display interface 740' to notify this other user of the received request by some indicator on the monitor 620'. The user of the receiving station will then input his/her private key portion via the station keyboard 630' if the user is willing to authorize the wiretap. In this case, the user's private key portion is directed by the input interface 730' over the bus 710' to the processor 700' of that user's computer 600'. The processor 700' is driven by its stored programming instructions to further encrypt the encrypted message with the inputted user's private key portion to thereby form the joint signature on the wiretap request as described in step 306 of FIG. 3. The jointly signed and encrypted request is now forwarded by the processor 700' to the network interface 760' for transmission over the network 12 to the central authority computer 600.

Referring again to FIGS. 6 and 7, the network interface 760 receives the jointly signed, i.e., jointly encrypted, wiretap request and directs it over the bus 710 to the processor 700. The processor 700 is driven by its stored programming instructions to retrieve the central authority portion of each user's private crypto-key and the public crypto-key associated with each user from the hard disk 724*a*. The processor 700 is then driven to apply the retrieved private key portions and public crypto-keys of both users to decrypt the wiretap request as indicated in step 308. Accordingly, the central authority not only has received a request for wiretap, but also has confirmed that the wiretap request is properly authorized, since it has been jointly signed by the two required authorities.

The processor 700 is now driven to retrieve the session key which was distributed as discussed above with reference to FIG. 2 to at least two users, other than those from whom the wiretap request has been received, from storage on, for example, the RAM 722. A message is generated by processor 700 with the session key as discussed in step 310 FIG. 3. The generated message is encrypted, as described above in step 312 of FIG. 3, by applying the previously retrieved central authority private key portions and public key portions of the two users who had jointly signed the wiretap request to the message. The encrypted message including the session key are now directed by the processor 700 to the network interface 760 for transmission via the network 12 to the user's requesting the wiretap.

Referring again to FIGS. 8 and 9, the encrypted session key is first received by the network interface 760' of one of the wiretap requestor's stations. The encrypted session key is forwarded from the network interface 760' to the processor 700'. The processor 700' in accordance with its stored programmed instructions transmits a signal which drives the display interface 740' to display a request for the user to enter his/her private key portion on the monitor 620'. As indicated previously, alternatively, the user's private key portion could be temporarily stored on the RAM 720' and retrieved directly by the processor 700' if so desired. In any event, the user's private key portion is applied to the encrypted session key to partially decrypt the session key as indicated in step 314 of FIG. 3. The processor now directs the network interface 760' to transmit the partially decrypted session key via the network 12 to the other signer of the wiretap request.

The other user's request station receives the partially decrypted session key via its network interface 760'. The station's processor 700' then queries the station user, via a signal which drives the display interface 740' to display a request on the monitor 620', for his/her private key portion. Alternatively, the user's private key portion could have been previously temporarily stored on the RAM 720'. In either event, the processor 700' is driven by its programmed instructions to apply the received user private key portion to the partially decrypted session key to fully decrypt the session key as indicated in step 316 of FIG. 3.

Referring again to FIGS. 6 and 7, the processor 700 further generates a switch instruction for the switch 70 of FIG. 1, as indicated in step 318 of FIG. 3. The switch instruction is encrypted by the processor 700 by retrieving the central authority's portion of the private crypto-key and the public crypto-key of the switch 70 from the hard disk 724*a* and applying these to encrypt the switch instructions, as discussed in connection with step 320 of FIG. 3. The processor 700 directs the encrypted instruction to be transmitted by the network interface 760 via the network 12 to the switch 70 of FIG. 1.

Figure 10:
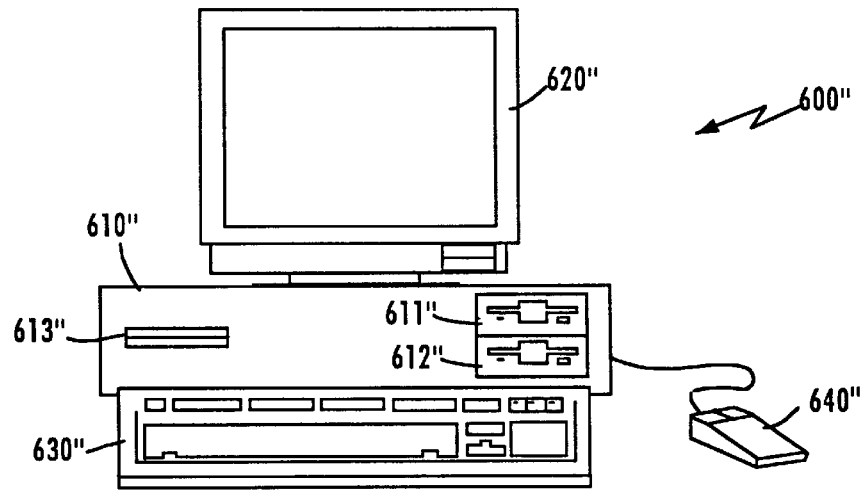
FIG. 10 depicts a computer suitable for use as the switch depicted in FIG. 1.
Figure 11:
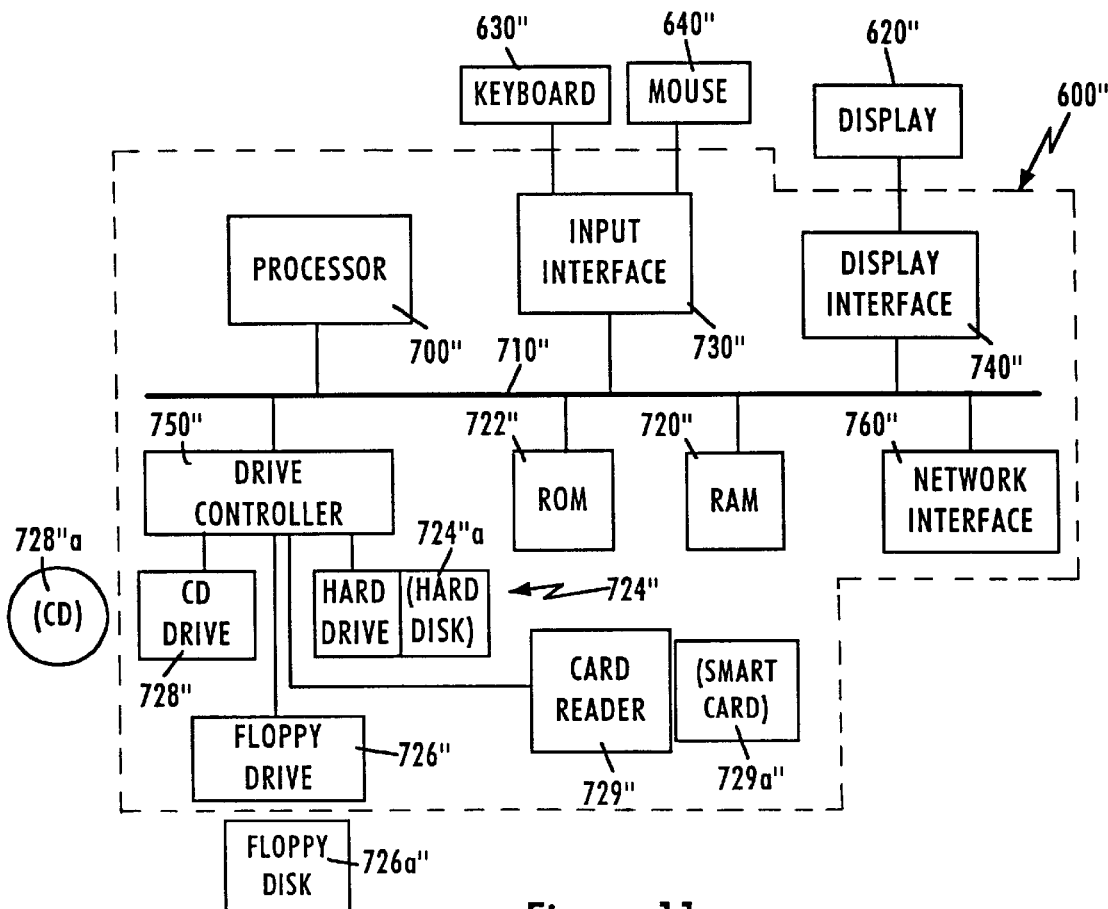
FIG. 11 is an exemplary block diagram of the computer depicted in FIG. 10.

The switch computer 600" is depicted in FIGS. 10 and 11. The encrypted instruction is received by the network interface 760" and transmitted via the bus 710" to the processor 700". The processor 700" receives the switch's private key portion which may be either retrieved from storage on the ROM 722" or hard disk 724*a*" or entered by a switch operator via the keyboard 630". As indicated in step 322 of FIG. 3, the processor 700" applies the switch's private key portion to the received encrypted instruction to decrypt the message, in accordance with the programming instructions stored, for example, on the ROM 722". In accordance with the switch instruction, the switch 70 configures the network 17 such that user communication encrypted with the session key are intercepted and diverted to the appropriate wiretap requester, as indicated in step 324 of FIG. 3.

Referring again to FIGS. 8 and 9, the diverted encrypted communications are received by the user station of the appropriate wiretap requestor via a network 760'. The received encrypted communication is forwarded via the bus 710' to the processor 700'. The processor 700' retrieves the session key which has preferably been stored on RAM 720'. The retrieved session key is applied in the conventional manner to decrypt the encrypted communication as indicated in step 326 of FIG. 3.

The operation of the respective computers 600 and 600' will be described in performing the steps shown in FIG. 4 in implementing privacy enhanced messaging in accordance with the present invention. Referring first to FIGS. 8 and 9, a user station or server first generates a message responsive to commands entered on the keyboard 630' or using mouse 640' of computer 600' as indicated in step 402 of FIG. 4. A hash function is stored on either the ROM 722' or hard disk 724*a*'. The hash function is retrieved from storage by the processor 700' and applied to the message, as discussed in step 404 of FIG. 4, by processor 700' to generate a hash message. The hash message is then encrypted, as indicated in step 406, with the user's private encryption key portion which is preferable entered by the user on the keyboard 630'. The processor 700', as indicated in step 408 of FIG. 4, also encrypts the message itself with a session key which has been previously provided to the user by the central authority as has been discussed above and is retrieved from temporary storage on the RAM 720'. The processor 700' next directs the network interface 760' to transmit the encrypted hash message and the encrypted message to the central authority.

Referring again to FIGS. 6 and 7, the transmitted encrypted messages are received by the network interface 760 and forwarded to the processor 700. The processor 700 retrieves the central authority's private key portion for the user who originated the message from the hard disk 724*a*. Processor 700 then further encrypts the encrypted hash message with the central authority's private key portion, as indicated in step 410 of FIG. 4. The processor 700 next directs the network interface 760 to transmit the further encrypted hash message and the message encrypted with the session key to another user having access to the previously distributed session key, via the network 12.

Referring again to FIGS. 8 and 9, the recipient is represented by a computer 600'. The transmitted encrypted messages are received by the network interface 760' and directed to the processor 700'. The processor 700' then retrieves the originating user's public crypto-key from, for example, storage on the hard disk 724*a*' and the session key from the RAM 720'. The processor 700' applies the originating user's public crypto-key to the received encrypted hash message to decrypt the hash message and the session key to the encrypted message to decrypt the message, as indicated in step 412 of FIG. 4.

Figure 12:
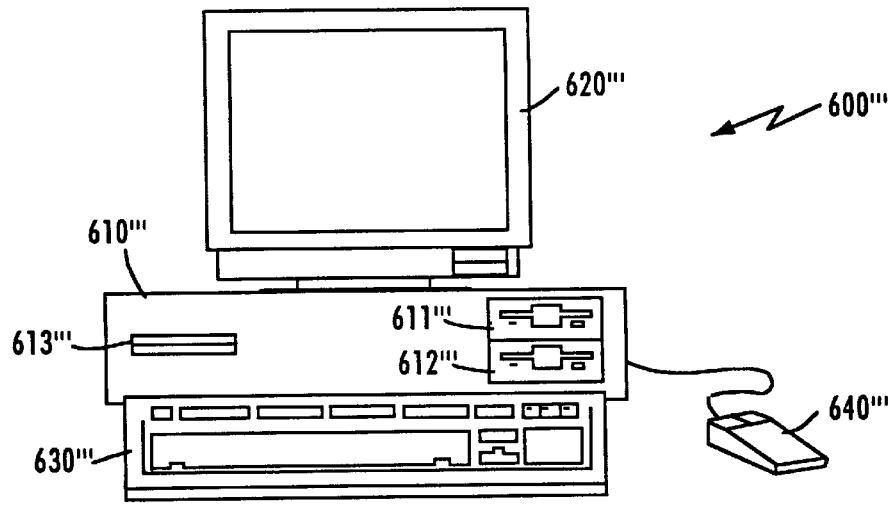
FIG. 12 depicts a computer suitable for use as the video distributors user station described in FIG. 5.
Figure 13:
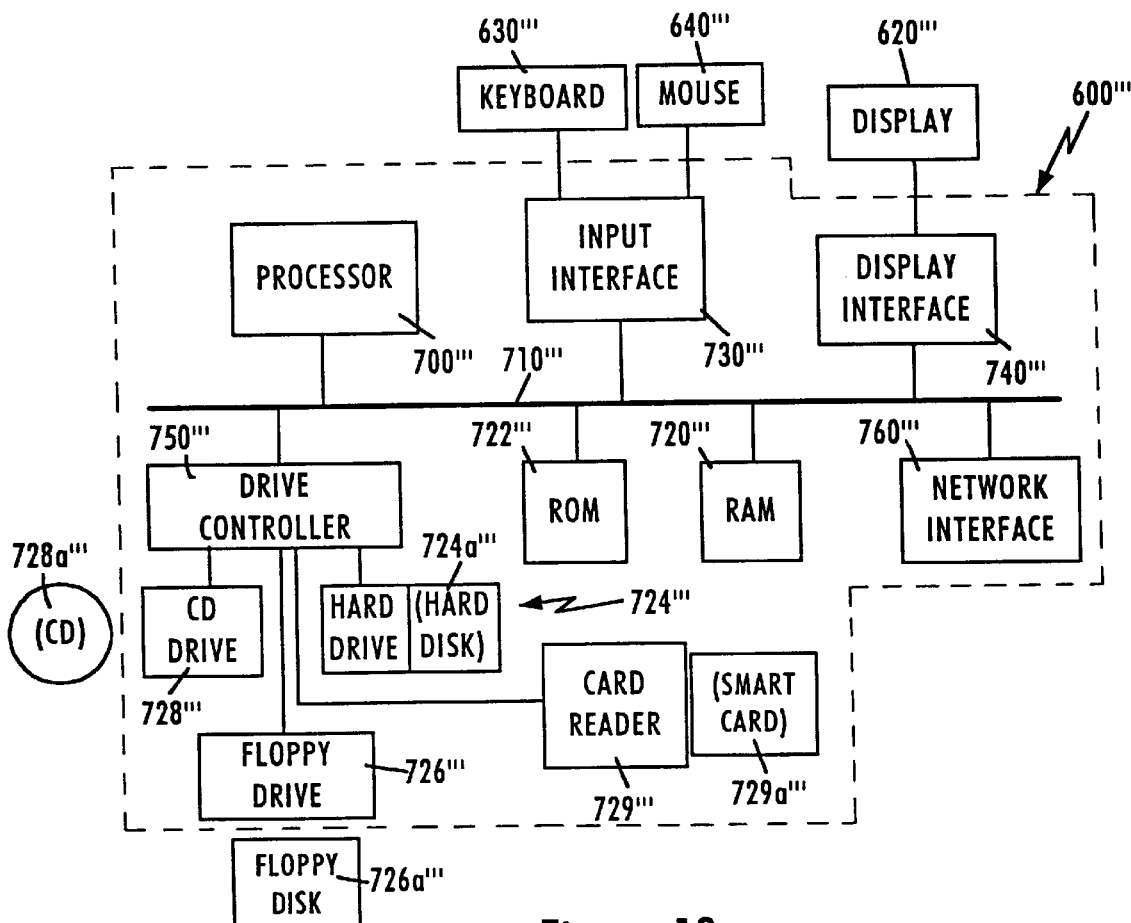
FIG. 13 is an exemplary block diagram of the computer depicted in FIG. 12.

Message distribution as discussed with reference to FIG. 5 will now be discussed. Referring first to FIGS. 12–13, the computer 600''' represents a video distributor. The Computer 600''' is similar to computer 600' depicted in FIGS. 8–9 except that the hard disk 724*a*''' or the ROM 722''' stores symmetric video encryption keys and its programmed instructions differ in certain respects which are detailed below. The processor 700''' retrieves a video encryption key from storage and applies it to a compressed video signal to encrypt the video as indicated in step 502 in FIG. 5. The processor 700''' then directs the network interface 760''' to transmit the encrypted video via the network 12 of FIG. 1 to the central authority.

Referring now to FIGS. 6 and 7, the encrypted video is received by the network interface 760 and directed by the processor 700 to the hard disk 724*a* for storage, as discussed in step 504 of FIG. 5.

Referring now to FIGS. 8 and 9, the processor 700' also generates a request in accordance with commands entered either using the keyboard 630' or mouse 640', which are preferably displayed on the monitor 620', requesting to view of video as discussed in step 506 of FIG. 5. The processor 700' directs the network interface 760' to transmit the request via the network 12 to the central authority.

Referring again to FIGS. 6 and 7, the transmitted request is received by the network interface 760 and directed to the processor 700 of the central authority computer 600. The processor 700, responsive to the request, generates, in accordance with its stored programming instructions, a session key as discussed in step 508 of FIG. 5. The processor 700 next retrieves the central authority's portion of the private crypto-keys and the public crypto-keys for both the requestor and the video distributor from the hard disk 724*a*. These keys are then applied by the processor 700 to encrypt the session key, as has been discussed previously and as indicated in step 510. Processor 700 then directs the network interface 760 to transmit the respectively encrypted session key to the requestor and the video distributor.

Referring again to FIGS. 12 and 13, the appropriately encrypted session key is received by the network interface 760''' and directed to the processor 700'''. Processor 700''' retrieves the video distributor's portion of his/her private crypto-key from the hard disk 724*a*''', and applies it to the encrypted session key to decrypt the session key as discussed in step 512 of FIG. 5. The requester station likewise decrypts the session key using the requestor's private key portion. The processor 700''' retrieves the video encryption key from storage and encrypts it with the session key as described in step 514 of FIG. 5. Processor 700''' now directs the network interface 760''' to transmit, via network 12 of FIG. 1, the encrypted video encryption key to the central authority.

Referring again to FIGS. 6 and 7, the transmitted encrypted video encryption key is received by the network interface 760 and directed to the processor 700. Processor 700 retrieves the encrypted video from the hard disk 724*a*. As indicated in step 516 of FIG. 5, the processor 700 retrieves from the hard disk 724*a* the central authority's portion of the private crypto-key and the public crypto-key associated with the requesting user. The processor 700 then applies these keys to further encrypt the video which has been previously encrypted with the video encryption key, as discussed in step 516 of FIG. 5. The processor 700 next directs the network interface 760 to transmit the further encrypted video and the encrypted video encryption key via the network 12 of FIG. 1 to the requesting user.

Referring again to FIGS. 8 and 9, the network interface 760' receives the video encryption key encrypted with the session key and the further encrypted video. The received signals are forwarded to the processor 700'. The processor 700' retrieves the session key from the RAM 720' and applies it to the received encrypted video encryption key to obtain the video encryption key as discussed in step 518 of FIG. 5. The processor 700' also applies the requesting user's private key portion and the video encryption key to the encrypted video to decrypt the video as indicated in step 520 of FIG. 5. The requesting user's private key portion is received either from commands entered on the keyboard by the user, responsive to a notice which the processor 700' has driven interface 740' to display on the monitor 620', or by retrieving the requesting user's private key portion which has been temporarily stored on the RAM 720'. In any event, the video has now been distributed and is available to the requesting user for playback on for example monitor 620' or otherwise.

As described above, the present invention provides a programmed computer and computer programming for automatic identity verification by a central intermediary prior to any information being exchanged using split private key public cryptography. Additionally, the described programmed computer and computer programming ensures that the users are authorized before a communications session is established. The programmed computer and computer programming facilitate the distribution of session keys, and the proper authorization and implementation of wire taps. The described programmed computer and computer programming are fully applicable to privacy enhanced messaging and are particularly suitable for the secure distribution of video, data and other messages.

It will also be recognized by those skilled in the art that, while the invention has been described above in terms of preferred embodiments it is not limited thereto. Various features and aspects of the above described invention may be used individually or jointly. Further, although the invention has been described in the context of their use in a particular environment, i.e., the public switched telephone network, those skilled in the art will recognize that the present invention can be beneficially utilized in virtually any environment. Accordingly, the claims set forth below should be construed in view of the full breath and spirit of the invention as disclosed herein.

I claim:

1. An article of manufacture for effecting secure communications during a communications session between users in a secured communication cryptosystem in which users are each associated with a public crypto-key and a private crypto-key, comprising:

computer readable storage medium; and computer programming stored on said storage medium;

wherein said stored computer programming is configured to be readable from said computer readable storage medium by a computer and thereby cause said computer to operate so as to:

generate a private crypto-key using a private exponent and a modulus N which is a product of a plurality of numbers within a set of large prime numbers, the modulus N having a bit length;

divide the generated private crypto-key into a private user key portion having a first bit length and a central authority key portion having a second bit length, wherein the first bit length is smaller than said second bit length and is no larger than fifteen percent of the bit length of the modulus N but no less than 56 bits;

direct the private user key portion to only a single user of the cryptosystem; and direct the central authority key portion to only a central storage device.

2. An article of manufacture according to claim 1 wherein the stored computer programming is configured to be readable from said computer readable storage medium by the computer to thereby cause said computer to operate so as to divide the generated private crypto-key into a private user key portion having a first bit length between 56 and 72 bits.

3. An article of manufacture according to claim 1 wherein the stored computer programming is configured to be readable from said computer readable storage medium by the computer to thereby cause said computer to operate so as to:

generate a public crypto-key using a public exponent and the modulus N; and direct the public crypto-key to the control storage device.

4. An article of manufacture according to claim 1, wherein the stored computer programming is configured to be readable from said computer readable storage medium by the computer to thereby cause said computer to operate so as to:

generate a symmetric session crypto-key;

generate a user session key by encrypting the generated symmetric session crypto-key with a combination of the public crypto-key and the central authority key portion; and direct the user session key to the user;

wherein the symmetric session key is obtainable by applying the private user key portion to the user session key such that the symmetric session key is available to encrypt and decrypt messages from and to the user.

5. An article of manufacture for effecting secure communications during a communications session between users in a secured communication cryptosystem in which users are each associated with a public crypto-key and a private crypto-key, said private crypto-key being divided between a central authority key portion maintained by a central authority and a private user key portion assigned to the user, comprising:

computer readable storage medium; and computer programming stored on said storage medium;

wherein said stored computer programming is configured to be readable from said computer readable storage medium by a computer and thereby cause said computer to operate so as to:

generate a symmetric session crypto-key;

retrieve from storage the central authority key portion associated with a first user and the central authority key portion associated with a second user from storage;

generate a first user session key by encrypting the generated symmetric session crypto-key with a combination of the public crypto-key and the retrieved central authority key portion associated with the first user;

generate a second user session key by encrypting the generated symmetric session key with a combination of the public crypto-key and the central authority key portion associated with the second user;

direct issuance of the first user session key to the first user; and direct issuance of the second user session key to the second user;

wherein the symmetric session crypto-key is obtainable by applying the private user key portion associated with the first user to the first user session key and by applying the private user key portion associated with the second user to the second user session key so that a common session crypto-key is available to the first user and the second user to encrypt and decrypt communications between said users.

6. An article of manufacture according to claim 5, wherein the stored computer programming is configured to be readable from said computer readable storage medium by the computer to thereby cause said computer to operate so as to:

retrieve from storage the public crypto-key associated with the first user and the public crypto-key associated with the second user;

generate the first user session key by encrypting the generated symmetric session crypto-key with a combination of the retrieved public crypto-key and the central authority key portion associated with the first user; and generate the second user session key by encrypting the generated symmetric session key with a combination of the public crypto-key and the central authority key portion associated with the second user.

7. An article of manufacture for effecting secure communications during a communications session between users in a secured communication cryptosystem in which users are each associated with a public crypto-key and a private crypto-key, said private crypto-key being divided between a central authority key portion maintained by a central authority and a private user key portion assigned to the user, comprising:

computer readable storage medium; and computer programming stored on said storage medium;

wherein said stored computer programming is configured to be readable from said computer readable storage medium by a computer and thereby cause said computer to operate so as to:

decrypt an encrypted first message by applying thereto the central authority key portion associated with a first user and the central authority key portion associated with a second user;

generate a second message;

encrypt the second message with a combination of the central authority key portion and the public crypto-key associated with the first user and the central authority key portion and the public crypto-key associated with the second user; and direct issuance of the encrypted second message to at least one of the first and the second users;

wherein, the second message is obtainable by applying thereto the private user key portion associated with the first user and the private user key portion associated with the second user.

8. An article of manufacture according to claim 7, wherein the stored computer programming is configured to be readable from said computer readable storage medium by the computer to thereby cause said computer to operate so as to generate the second message so as to include a common session encryption key directed to other users.

9. An article of manufacture according to claim 7, wherein the stored computer programming is configured to be readable from said computer readable storage medium by the computer to thereby cause said computer to operate so as to:

decrypt the encrypted first message by applying the public crypto-key associated with the first user and the public crypto-key associated with the second user thereto; and encrypt the second message with the public crypto-key associated with the first user and the public crypto-key associated with the second user.

10. An article of manufacture for effecting secure communications during a communications session between users in a secured communication cryptosystem in which users are each associated with a public crypto-key and a private crypto-key, said private crypto-key being divided between a central authority key portion maintained by a central authority and a private user key portion assigned to the user, comprising:

computer readable storage medium; and computer programming stored on said storage medium;

wherein said stored computer programming is configured to be readable from said computer readable storage medium by a computer and thereby cause said computer to operate so as to:

encrypt a request for a symmetric session crypto-key by applying the private user key portion associated with a user to the request;

direct the encrypted request to the central authority;

decrypt a symmetric session crypto-key encrypted with a combination of the central authority key portion and the public crypto-key associated with the user by applying thereto the private user key portion associated with the user to obtain the symmetric session crypto-key; and apply the symmetric session crypto-key to encrypt and decrypt communications between the user and at least one other user.

11. An article of manufacture according to claim 10, wherein the stored computer programming is configured to be readable from said computer readable storage medium by the computer to thereby cause said computer to operate so as to:

generate a hash message by applying a hash function to a message to be communicated to the at least one other user;

encrypt the hash message with the symmetric session crypto-key; and direct the encrypted hash message to the at least one other user;

wherein the hash message is obtainable by the at least one other user by applying the symmetric session crypto-key to the encrypted hash message.

12. A programmed computer for effecting secure communications during a communications session between users in a secured communication cryptosystem in which users are each associated with a public crypto-key and a private crypto-key, comprising:

a processor configured to generate a private crypto-key using a private exponent and a modulus N which is a product of a plurality of numbers within a set of large prime numbers, to divide the generated private crypto-key into a private user key portion having a first bit length and a central authority key portion having a second bit length, and to direct the private user key portion to only a single user of the cryptosystem; and a storage device configured to store the central authority key portion;

wherein, the modulus N has a bit length, and the first bit length is smaller than said second bit length and is no larger than fifteen percent of the bit length of the modulus N but no less than 56 bits.

13. A programmed computer according to claim 12, wherein said processor is adapted to divide the generated private crypto-key into a private user key portion having a first bit length between 56 and 72 bits.

14. A programmed computer according to claim 12, wherein:

said processor is further configured to generate a public crypto-key using a public exponent and the modulus N; and said storage device is further configured to store the public crypto-key.

15. A programmed computer according to claim 12, wherein:

the processor is further configured to generate a symmetric session crypto-key, to generate a user session key by encrypting the generated symmetric session crypto-key with a combination of the public crypto-key and the central authority key portion associated with the user, and direct issuance of the user session key to the user; and the storage device is further configured to store the symmetric session crypto-key;

wherein the symmetric session crypto-key is obtainable by applying the private user key portion associated with the user to the user session key such that the symmetric session key is available to encrypt and decrypt messages from and to the user.

16. A programmed computer for effecting secure communications during a communications session between users in a secured communication cryptosystem in which users are each associated with a public crypto-key and a private crypto-key, said private crypto-key being divided between a central authority key portion maintained by a central authority and a private user key portion assigned to the user, comprising:

a storage device configured to store the central authority key portion associated with a first user and the central authority key portion associated with a second user;

a processor configured to generate a symmetric session crypto-key, to retrieve the central authority key portion associated with the first user and the central authority key portion associated with the second user from the storage device, to generate a first user session key by encrypting the generated symmetric session crypto-key with a combination of the public crypto-key and the retrieved central authority key portion associated with the first user, to generate a second user session key by encrypting the generated symmetric session key with a combination of the public crypto-key and the retrieved central authority key portion associated with the second user, to direct the first user session key to the first user, and to direct the second user session key to the second user;

wherein the symmetric session crypto-key is obtainable by applying the private user key portion associated with the first user to the first user session key and by applying the private user key portion associated with the second user to the second user session key so that a common session crypto-key is available to the first and the second users to encrypt and decrypt communications between said users.

17. A programmed computer according to claim 16, wherein:

the storage device is further configured to store the public encryption key associated with the first user and the public encryption key associated with the second user; and the processor is further configured to retrieve the public encryption key associated with the first user and the public encryption key associated with the second user from the storage device, to generate the first user session key by encrypting the generated symmetric session crypto-key with a combination of the central authority key portion and the retrieved public encryption key associated with the first user, and to generate the second user session key by encrypting the generated symmetric session key with a combination of the central authority key portion and the public encryption key associated with the second user.

18. A programmed computer for effecting secure communications during a communications session between users in a secured communication cryptosystem in which users are each associated with a public crypto-key and a private crypto-key, said private crypto-key being divided between a central authority key portion maintained by a central authority and a private user key portion assigned to the user, comprising:

a storage device configured to store the central authority key portion associated with a first user and the central authority key portion associated with a second user; and a processor configured to retrieve from said storage device the central authority key portion associated with the first user and the central authority key portion associated with the second user, to decrypt a first message encrypted with a combination of the private user key portion of the first user and the private user key portion of the second user by applying thereto the retrieved central authority key portion associated with the first user and the retrieved central authority key portion associated with the second user, to generate a second message, to encrypt the second message with a combination of the public crypto-key and the retrieved central authority key portion associated with the first user and the public crypto-key and the retrieved central authority key portion associated with the second user, and to direct the encrypted second message to at least one of the first and the second users;

wherein, the second message is obtainable by applying thereto the private user key portion associated with the first user and the private user key portion associated with the second user.

19. A programmed computer according to claim 18, wherein the second message is a common session encryption key used to secure communications between other users.

20. A programmed computer according to claim 18, wherein:

the storage device is further configured to store the public crypto-key portion associated with the first user and the public crypto-key portion associated with the second user; and the processor is further configured to decrypt the first message by applying the public crypto-key associated with the first user and the public crypto-key associated with the second user thereto, and to encrypt the second message with the public crypto-key associated with the first user and the public crypto-key associated with the second user.

21. A programmed computer for effecting secure communications during a communications session between users in a secured communication cryptosystem in which users are each associated with a public crypto-key and a private crypto-key, said private crypto-key being divided between a central authority key portion maintained by a central authority and a private user key portion assigned to the user, comprising:

a processor configured to encrypt a request for a symmetric session crypto-key by applying a combination of the public crypto-key and the central authority key portion associated with a user to the request, to direct the encrypted request to the central authority, to decrypt a symmetric session crypto-key encrypted with the combination of the public crypto-key and the central authority key portion associated with the user by applying thereto the private user key portion associated with the user to obtain the symmetric session crypto-key, and to apply the symmetric session crypto-key to encrypt and decrypt communications between the user and at least one other user; and a storage device configured to store the symmetric session crypto-key.

22. A programmed computer according to claim 21, wherein:

the processor is further configured to generate a hash message by applying a hash function to a message to be communicated to the at least one other user, to encrypt the hash message with the symmetric session crypto-key, and to direct the encrypted hash message to the at least one other user; and the hash message is obtainable by the at least one other user by applying the symmetric session crypto-key to the encrypted hash message.

* * * * *